United States Patent Office 3,211,204
Patented Oct. 12, 1965

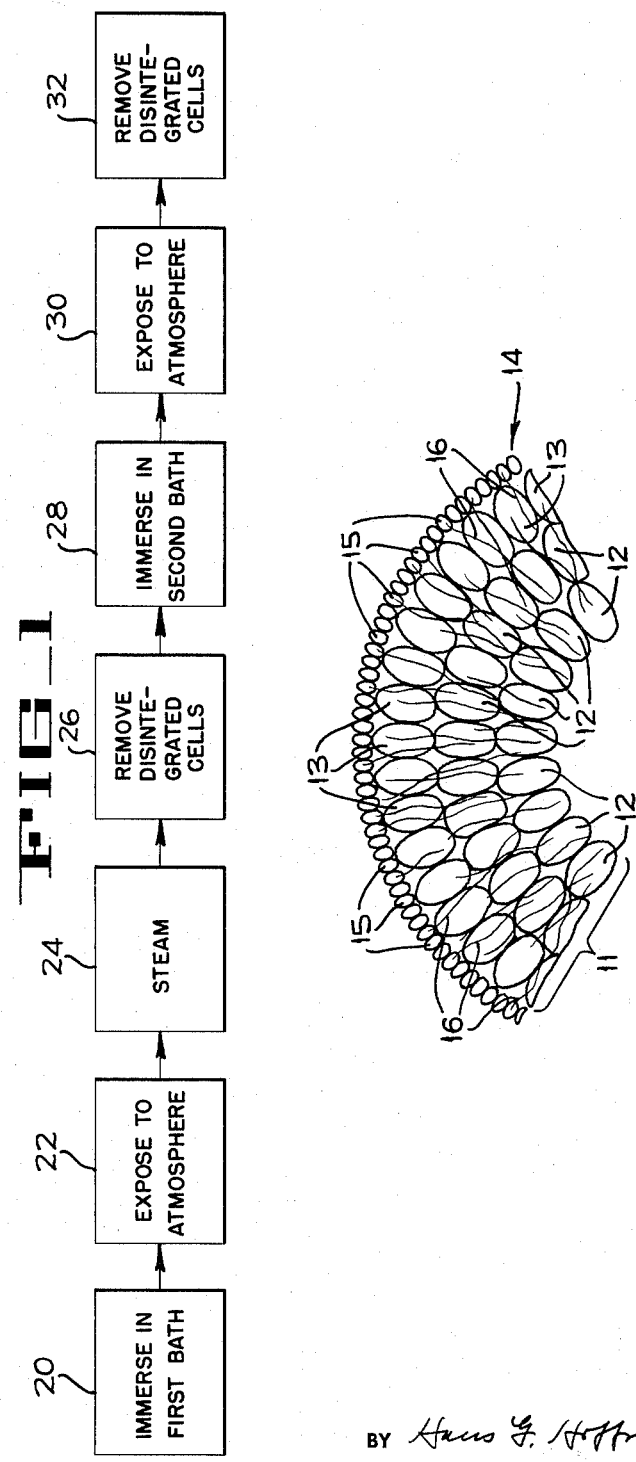

3,211,204
PEAR PEELING METHOD
Harold W. Adams and Katsuji Hirahara, San Jose, Calif., assignors to FMC Corporation, San Jose, Calif., a corporation of Delaware
Filed May 13, 1963, Ser. No. 279,992
9 Claims. (Cl. 146—234)

The present invention pertains to a method for preparing fruit for canning and more particularly to a method for caustically peeling pears in which the loss of edible fruit is minimized and the browning of the peeled pears is retarded or prevented so that the pears have their natural color when they are canned.

When a pear is peeled, subsequent exposure of the pear flesh to the atmosphere for a certain time may cause it to turn brown. The reason for this browning is that the pears have a granular and fibrous layer or layers of so-called stone cells between the outer layer or layers of epidermal cells, or peel, and the innermost flesh, the latter being composed of parenchyma cells. The stone cells contain a pigment that is activated when these cells are heated or mechanically damaged and then exposed to the atmosphere.

If a pear of marketable hardness is cut or peeled with a knife, and is not subjected to heat damage, browning of its flesh as a result of exposure to the atmosphere naturally occurs in about thirty minutes, it being understood that the natural browning time for different lots of pears may vary depending on pear maturity, geographical location, practices of cultivation, ripening conditions, and other factors. If effort is made to peel pears by the common lye peeling method used on stone fruits, such as peaches, the pear is heat-damaged and the exposed pear flesh turns brown much more rapidly, usually within about sixty seconds.

It is recognized that browned, discolored pears are not marketable, at least as high grade fruit. Consumers and canneries demand that the prime fruit for canning have a natural color, this color being usually referred to as white. Assuming that the stone cells of the pears have been damaged during processing, it is necessary to can the fruit quickly, and thereby isolate it from atmospheric oxygen, before browning is noticeable.

Since pears peeled by common lye peeling methods brown almost immediately, it was at one time believed that caustic peeling of pears was not practicable on a commercial scale. However a commercially practicable method and apparatus for chemically peeling pears is discussed in the copending U.S. application by Hickey, et al., Serial No. 206,786, filed July 2, 1962, and titled, "Method and Apparatus for Preparing Fruit." Using this method and apparatus, the advantages of chemically peeling, as contrasted with mechanical, knife peeling, are now being achieved. These advantages include increased yield of edible fruit, uniformity of peeling, greater processing capacity in a given time and economies of time and labor; in addition, the canned pears have a natural color.

The above cited application discloses an integrated fruit preparation method that provides for the continuous movement of fruit along a processing line. As the fruit are moved they are successively immersed in a caustic bath, steamed, brushed and washed, oriented, stemmed, cored and canned. In this integrated method, the pears are canned within about thirty minutes or less after they have been brushed and washed. Accordingly, since the method disclosed in said copending application retards browning for more than thirty minutes following washing and brushing, sufficient time is available to can the pears and isolate them from the oxygen in the air.

The present invention pertains to another method whereby pears can be chemically peeled and thereafter allowed to remain exposed to atmospheric oxygen for many hours without browning. In fact, the period elapsing between peel removal and the appearance of noticeable browning, if it occurs at all, is several times longer than the average normal browning period of thirty minutes for cut or knife-peeled pears.

Accordingly, it is an object of the present invention to provide a method for chemical peeling and treating pears so that the flesh of the peeled fruit can remain exposed to atmospheric oxygen for many hours without browning.

Another object is to provide a method for removing the peel and conditioning the exposed flesh of a pear so that the time elapsing before occurrence of noticeable browning is considerably longer than the natural browning time of cut or knife-peeled pears.

Another object is to provide a method for chemical peeling pears in an integrated processing line of the type disclosed in the above identified patent application or in a peeling unit from which they are moved and manually placed in a stemming and coring unit separate from the peeling unit.

Another object is to provide a chemical, fruit peeling method that is uniquely suited to the inherent characteristics of pears for removing all of the peel of the pears, substantially all of the underlying browning susceptible cells, and a minimum amount of the innermost edible flesh composed of non-browning cells.

These, together with other objects, will be apparent from the following description and accompanying drawings, in which:

FIG. 1 is a flow diagram indicating the steps of the subject method.

FIG. 2 is a greatly enlarged fragmentary section of a pear showing the cell structure thereof.

Before describing the steps of the present method in detail, these steps are summarized at this point, it being noted that the steps are performed in the sequence listed and as indicated in FIG. 1:

1. immersing the pears in a first caustic bath 20 so that the pears are impregnated and coated with caustic and so that the peel of each pear is partially disintegrated, said pears being thereafter removed from said bath,
2. exposing the impregnated and caustically coated pears to the atmosphere, at 22 in FIG. 1,
3. steaming the coated pears, at 24, thereby completely disintegrating their peels and some of the stone cells,
4. removing the disintegrated peels and cells from the pears, thereby exposing heat-damaged stone cells,
5. immersing the pears in a second caustic bath to precondition the damaged cells and exposed hair-like fibers for removal, said pears thereafter being removed from said second bath,
6. exposing the pears to the atmosphere, and
7. removing most all of the stone cells and fibers, thereby exposing naturally colored flesh that does not brown for many hours and which may not brown at all depending on the residuum of damaged stone cells remaining on the fruit.

To facilitate a better understanding of the subject method, a portion of a pear 10 is diagrammatically shown in greatly enlarged scale in FIG. 2. The flesh 11 of the pear includes inner parenchyma cells 12 enveloped by layers of stone cells 13. The peel 14 of the pear is composed of epidermal cells 15 which surround the layers of stone cells. Furthermore, the pear has hair-like fibers 16 projecting out of the parenchyma cells 12 and through the stone cells 13.

In carrying out the first step of the subject method, whole, unpeeled pears are immersed in a relatively concentrated, hot caustic bath 20 (FIG. 1), hereinafter referred to as the first or concentrated bath, for a very short time. These pears may range in degrees of maturity from hard pears which have a reading of three and above on the Ballauf pear hardness tester and are intended to be diced for cocktail use, to softer, more mature pears, that have a reading of from zero to three on the Ballauf tester and are intended for grade packing, that is packing of higher quality fruit in halves or quarters. It will be understood, however, that during a particular period of operation of the present method, the pears being processed will have approximately the same condition of hardness.

The concentration of this first bath 20 is from about eighteen percent by weight of lye in water (that is about eighteen parts lye to about eighty-two parts water by weight) to about twenty percent by weight of lye in water. Preferably, the bath also includes a wetting agent for reducing surface tension and promoting intimate contact of the caustic with the fruit; about 0.2 percent to 0.5 percent by weight of the wetting agent Tergitol 08 (sodium 2 ethyl hexyl sulfate) is excellently suited for this purpose. The temperature of the first bath is maintained at approximately the boiling temperature of the aqueous caustic solution, namely from about 214° F. to about 218° F.

The length of time the pears are kept immersed in this first bath 20 is critical for each set of concentration and temperature conditions. In this regard, it is to be noted that the prime function of the first four steps of the method is to remove the peel 14. Since the epidermal cells 15 of the peel resist the disintegrating action of the caustic more than the stone and parenchyma cells 13 and 12, respectively, the first bath has to be strong enough to precondition the peel for removal. If this stronger caustic is allowed to move appreciably inwardly from the peel, however, it would rapidly penetrate the stone and the parenchyma cells and cause undesired damage thereto. Heat-damage to pear flesh is so extreme at about 160° F. and above that browning occurs almost immediately upon exposure of the damaged flesh to the atmosphere. Therefore, the pears are kept in the first bath only long enough for the peel to be penetrated and partially disintegrated by the caustic. It is recognized that the rate of penetration of the caustic will not be uniform about the circumference of the pear, so that some penetration inward of the peel may occur, but this penetration is minimized by careful control of the time. According to the present method, an immersion time of from about twenty seconds to about forty seconds allows the aqueous caustic to impregnate the pear substantially only to the depth of the peel, and no farther, so that the peel is partially disintegrated whereas the cells of the flesh underlying the peel are not appreciably heat-damaged.

When the pears are removed from the concentrated bath 20 of caustic, they are both coated and impregnated with caustic and their peels are partially disintegrated. As indicated at 22 in FIG. 1, the second step of the present method involves exposing the pears to the atmosphere at room temperature of about 70° F. for between about one minute to about two minutes. Excess caustic on the fruit is drained during this time, and the caustic on the fruit is allowed to act on the peel with a view toward complete disintegration of the peel in the steaming step which follows. The exposing step is conveniently carried out as the pears are being moved from the first bath to the steam environment of the third step.

After the described exposure, the impregnated and coated pears 10 are subjected to flowing steam, as indicated at 24 in FIG. 1, under atmospheric pressure for from about fifteen seconds to about sixty seconds, this being the third step of the method. Following the steaming step, the peels 14 of the pears are substantially completely disintegrated and in condition for removal.

As the fourth step of the method (26 in FIG. 1) the preconditioned pears are washed, with or without light brushing, thereby removing the disintegrated peel 14 and a portion of the underlying stone cells 13. It is to be noted that the removed peel and flesh are dissolved and finely fragmented because of the impregnation of the caustic into the cells, as above described.

The first four steps of the subject method can be performed with equipment, not shown but well known in the art, such as for example, a conveyor that carries the pears through the caustic bath 20 and then out of the bath through the steaming and removing stations 24 and 26.

The stone cells 13 of the pears that emerge from the removing station 26 are exposed but are not preconditioned for removal. Nevertheless, they are heated sufficiently to activate the pigment therein whereby browning will occur rapidly upon exposure to the atmosphere. Browning is retarded or completely prevented according to the present invention by using a secondary heat treatment.

Thus, in the fifth step (28 in FIG. 1), the pears are immersed in a relatively dilute caustic bath, hereinafter referred to as the second or dilute bath, for a very short time. The concentration of this second bath is from about four percent to about six percent by weight of lye in water. A wetting agent is also preferably employed in a manner similar to that described above in the concentrated bath 20. The temperature of the dilute bath is about 195° F. and thus is somewhat cooler than the concentrated bath. Although the second bath is of low concentration, the time of immersion in the second bath is only about thirty seconds at said temperature of about 195° F. Even through the stone cells 13 do not resist the caustic like the epidermal cells 15, the weaker caustic of the second bath soaks into the pears substantially only to the depth of the stone cells within the specified time. In this manner, substantially only the heat-damaged, browning susceptible stone cells are disintegrated during the immersion of the pears in the dilute bath. Because the depth of penetration of the weak caustic can be controlled, there is no appreciable disintegration of the inner parenchyma cells 12. The yield of edible fruit is therefore maximized.

The hair-like fibers 16 resist the disintegrating action of the concentrated bath 20 so that many of these fibers remain attached to and exposed on the pear flesh after the disintegrated peel and cells have been removed in the fourth step. Like the heat-damaged stone cells 13, these hair-like fibers also turn brown rapidly upon exposure to atmosphere. However, immersion of the pears in the dilute caustic bath 28 disintegrates and preconditions these fibers for removal in the seventh or second washing step. As the sixth and seventh steps of the method (30 and 32 in FIG. 1), the pears 10 are removed from the dilute bath and exposed to the atmosphere for about three minutes and then washed with or without light brushing, thereby removing the disintegrated stone cells 13 and said hair-like fibers 16 and exposing naturally colored pear flesh that does not brown for many hours or perhaps not at all. In actual use of the present method, browning has been retarded for from one to ten hours.

After the pears have been prepared according to the above described steps of the present invention, they are ready to be stemmed, cored and canned. During this subsequent processing, which may require an hour or more, the exposed flesh of the pears retains its natural color. By using the subject method to condition pears for canning, the advantages of chemical fruit peeling are achieved without the normally accompanying disadvantages of browning and while minimizing the loss of edible fruit.

Although various concentrations, temperatures and times have been stated in the foregoing description, it is to be understood that the invention is not limited to the precise values given herein. It has been determined that adherence to these values in carrying out the process yields the desired results, but depending on the hardness of the pears, it is possible that departures from these values will produce results similar to those achieved with the stated values. Regardless of the precise concentration, temperature and time used, however, the significant factors of the invention are that the first caustic treatment is sufficient to disintegrate substantially all of the peel or epidermal cells and a minimum of the stone cells (although it incidentally heat-damages some of the stone cells) and that the second caustic treatment is sufficient to disintegrate substantially all of the stone cells and hair-like fibers but does not appreciably disintegrate the parenchyma cells. If these two factors are carefully observed, a high yield of edible fruit will be obtained and the exposed flesh will be naturally colored since it will be composed almost entirely of parenchyma cells which do not brown.

The invention having thus been described, what is believed to be new and desired to be protected by Letters Patent is:

1. A method of peeling a pear which has inner non-browning parenchyma cells surrounded by browning-susceptible stone cells and a peel of epidermal cells surrounding the stone cells, comprising the steps of caustically treating the peel of the pear to disintegrate the peel, removing the disintegrated peel to expose the stone cells, causically treating the stone cells to disintegrate the same, and removing the disintegrated stone cells to expose the underlying non-browning parenchyma cells.

2. A method of peeling a pear comprising caustically treating the pear to disintegrate substantially only the peel of the pear, said caustic treatment incidentally heat-damaging the browning susceptible cells underlying the peel, removing the disintegrated peel from the pear, caustically treating the pear to disintegrate substantially only the browning-susceptible cells, and removing the disintegrated cells from the pear.

3. A method of peeling a pear comprising applying a caustic to the pear in a manner sufficient to penetrate the pear substantially only to the depth of the peel and not appreciably into the underlying, browning-susceptible stone cells whereby substantially all of the peel and a portion of said stone cells are disintegrated, removing the disintegrated peel and the disintegrated stone cells from the pear, applying caustic to the exposed stone cells remaining on the pear in a manner sufficient to penetrate the pear substantially only to the depth of the stone cells and not appreciably into the underlying parenchyma cells whereby substantially all of the stone cells are disintegrated, and removing the disintegrated stone cells from the pear thereby exposing the non-browning parenchyma cells.

4. A method of peeling a pear comprising subjecting the pear to a relative strong caustic treatment of such concentration and temperature and for such time as to allow the caustic to penetrate the peel of the pear without appreciable penetration into the browning-susceptible cells immediately underlying the peel whereby the peel is substantially completely disintegrated, removing the disintegrated peel from the pear, subjecting the peeled pear to a relatively weak caustic treatment of such concentration and temperature and for such a time that the caustic penetrates the browning-susceptible cells but does not appreciably penetrate into the non-browning cells underlying said browning cells whereby said browning cells are substantially completely disintegrated, and removing said disintegrated cells from the pear.

5. A method of treating a pear so that the peel is removed and the exposed flesh is naturally colored and will not brown if exposed to the atmosphere for a time longer than the natural browning time of knife-peeled pears comprising the steps of coating the pear with a first caustic and then steaming the coated pear to completely disintegrate said peel and a portion of the underlying flesh, removing the disintegrated peel and flesh from the pear, coating the exposed flesh of the pear with a second caustic to disintegrate a predetermined depth of the exposed flesh and precondition it for removal, and removing said disintegrated flesh from the pear thereby exposing naturally colored browning-resistant flesh.

6. A method of peeling a pear so that the peel is removed and the exposed flesh is naturally colored and will not brown if exposed to the atmosphere for a time longer than the natural browning time of knife-peeled pears comprising the steps of coating the pear with a relatively hot, concentrated caustic to partially disintegrate its peel, steaming the coated pear to completely disintegrate said peel and a portion of the underlying flesh, removing the disintegrated peel and flesh from the pear, coating the exposed flesh of the pear with a relatively cool, weak caustic to disintegrate a predetermined depth of the exposed flesh and precondition it for removal, and removing said disintegrated flesh from the pear thereby exposing naturally colored browning-resistant flesh.

7. The method of claim 4 including the step of exposing the pears to the atmosphere after each caustic coating step.

8. A method for caustically peeling pears so that the peeled pears can be exposed to the atmosphere for a time that is at least more than twice the time it takes knife-peeled pears to turn brown, comprising immersing whole unpeeled pears in a first caustic bath having a concentration from about 18% to about 20% by weight of caustic in water and at about the boiling temperature of said bath for a duration sufficient to partially disintegrate the peel of the pears; removing the pears from said bath whereby a coating of caustic remains on each pear and impregnates the peel thereof; subjecting the coated and impregnated pears to steam from about 15 seconds to about 60 seconds whereby the peels are substantially completely disintegrated; removing the disintegrated peel from the pears and thereby exposing browning-susceptible flesh of predetermined depth; immersing the peeled pears in a second caustic bath having a concentration of from about 4% to about 6% by weight of caustic in water at a temperature of about 195° F. for a duration of about 30 seconds thereby to precondition said browning-susceptible flesh for removal; and removing said browning-susceptible flesh to expose non-browning flesh that is naturally colored.

9. A method of caustically peeling pears comprising immersing whole unpeeled pears in a concentrated caustic bath having a concentration from about 18% to about 20% by weight of caustic in water and at about the boiling temperature of said bath for a duration of between about 20 seconds to about 40 seconds thereby partially disintegrating the peels of the pears; removing the pears from said bath and holding them exposed to the atmosphere at normal room temperature for between about 1 minute to about 2 minutes; subjecting the pears, following said holding thereof, to flowing steam under atmospheric pressure from about 15 seconds to about 60 seconds whereby the peels are substantially completely disintegrated; washing the steamed pears to remove the disintegrated peels, each peeled pear having exposed cells that are heated sufficiently to be susceptible to rapid browning upon exposure to the atmosphere; immersing the washed pears in a dilute caustic bath having a concentration of from about 4% to about 6% by weight of caustic in water at a temperature of about 195° F. for a duration of about 30 seconds thereby preconditioning said browning susceptible cells and hair-like fibers on the pear for removal; and washing said pears upon emersion from said dilute bath for removing said cells and hair-like fibers of the peel.

References Cited by the Examiner

UNITED STATES PATENTS

| 1,444,386 | 2/23 | Pyle | 146—234 X |
|---|---|---|---|
| 1,655,690 | 1/28 | Dunkley | 146—234 X |
| 3,017,298 | 1/62 | Wilson et al. | 146—234 |
| 3,115,174 | 12/63 | Loveland | 146—235 |

J. SPENCER OVERHOLSER, *Primary Examiner.*